United States Patent
Lee et al.

(10) Patent No.: US 8,331,311 B2
(45) Date of Patent: Dec. 11, 2012

(54) DISTRIBUTED CHANNEL HOPPING METHOD IN WIRELESS AD-HOC NETWORK

(75) Inventors: Anseok Lee, Gyeongsangbuk-Do (KR); Wun Cheol Jeong, Daejeon (KR); Chang Sub Shin, Daejeon (KR); Seong Soon Joo, Daejeon (KR); Jong Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 459 days.

(21) Appl. No.: 12/553,630

(22) Filed: Sep. 3, 2009

(65) Prior Publication Data

US 2010/0296493 A1    Nov. 25, 2010

(30) Foreign Application Priority Data

Nov. 11, 2008  (KR) .................. 10-2008-0111853
Aug. 11, 2009  (KR) .................. 10-2009-0074003

(51) Int. Cl.
*H04W 4/00*   (2009.01)
*H04J 3/00*   (2006.01)
*H04J 4/00*   (2006.01)
*H04B 7/212*  (2006.01)

(52) U.S. Cl. ........ 370/330; 370/336; 370/345; 370/442; 370/478

(58) Field of Classification Search .................. 370/221, 370/235–236, 238, 252–253, 310–350, 437, 370/442, 468, 478, 480; 455/62–69, 522
See application file for complete search history.

(56) References Cited

U.S. PATENT DOCUMENTS

| | | | | |
|---|---|---|---|---|
| 7,529,217 | B2* | 5/2009 | Pister et al. | 370/338 |
| 7,881,340 | B2* | 2/2011 | Farrag et al. | 370/468 |
| 7,936,709 | B2* | 5/2011 | Bhatti et al. | 370/326 |
| 2008/0137599 | A1 | 6/2008 | Ham et al. | |
| 2010/0034159 | A1* | 2/2010 | Shin et al. | 370/329 |
| 2010/0111050 | A1* | 5/2010 | Jeong | 370/337 |
| 2010/0260085 | A1* | 10/2010 | Wang et al. | 370/311 |
| 2010/0290451 | A1* | 11/2010 | Karaoguz et al. | 370/347 |
| 2011/0032912 | A1* | 2/2011 | Cordeiro et al. | 370/336 |

OTHER PUBLICATIONS

Wun-Cheol Jeong, et al., "Cyclicframe Structure to enhance IEEE 802.15.4-2006 MAC," Project: IEEE P802.15 Working Group for Wireless Personal Area Networks (WPANs), Sep. 2008.

\* cited by examiner

*Primary Examiner* — Tri H Phan
(74) *Attorney, Agent, or Firm* — Staas & Halsey LLP

(57) ABSTRACT

A distributed channel hopping communication method in a low power wireless ad-hoc network. A beacon transmission and reception scheduling method using a distributed channel hopping method in a wireless ad-hoc network, the method includes: transmitting beacons using channel hopping, before establishing the wireless ad-hoc network including a plurality of nodes having a BP including at least one time slot, and receiving beacons of a plurality of neighboring nodes of each of the plurality of nodes; collecting information about the wireless ad-hoc network and information about the plurality of neighboring nodes from the received beacons; scheduling the receiving of the beacons that are transmitted from the plurality of neighboring nodes in the BP, using TDMA in each of the at least one time slot based on the information about the plurality of neighboring nodes; and scheduling transmitting of a beacon in each of the at least one time slot.

16 Claims, 7 Drawing Sheets

FIG. 2A
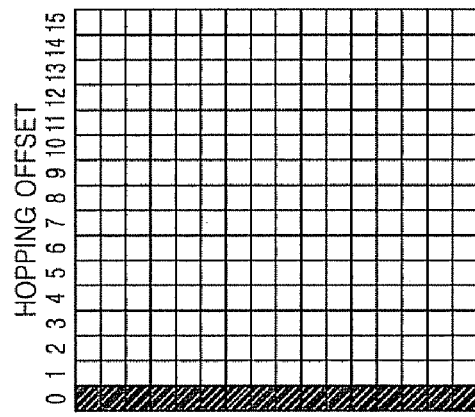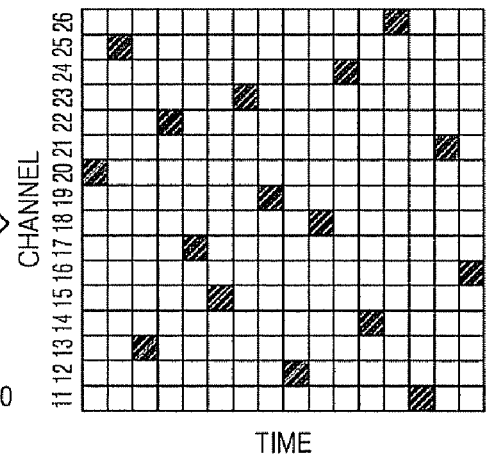
FIG. 2B
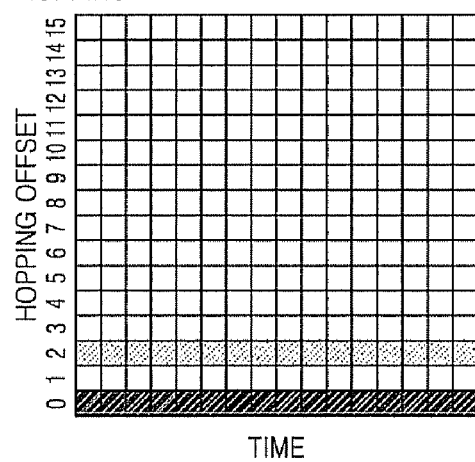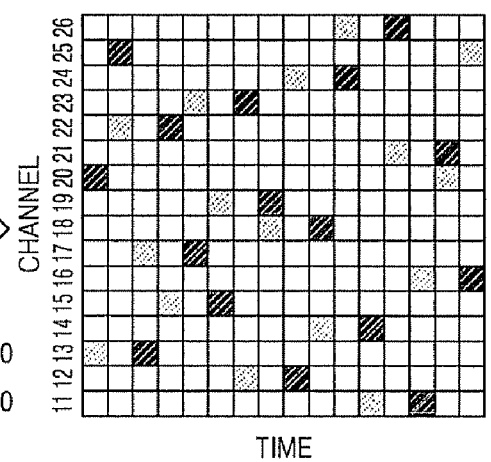

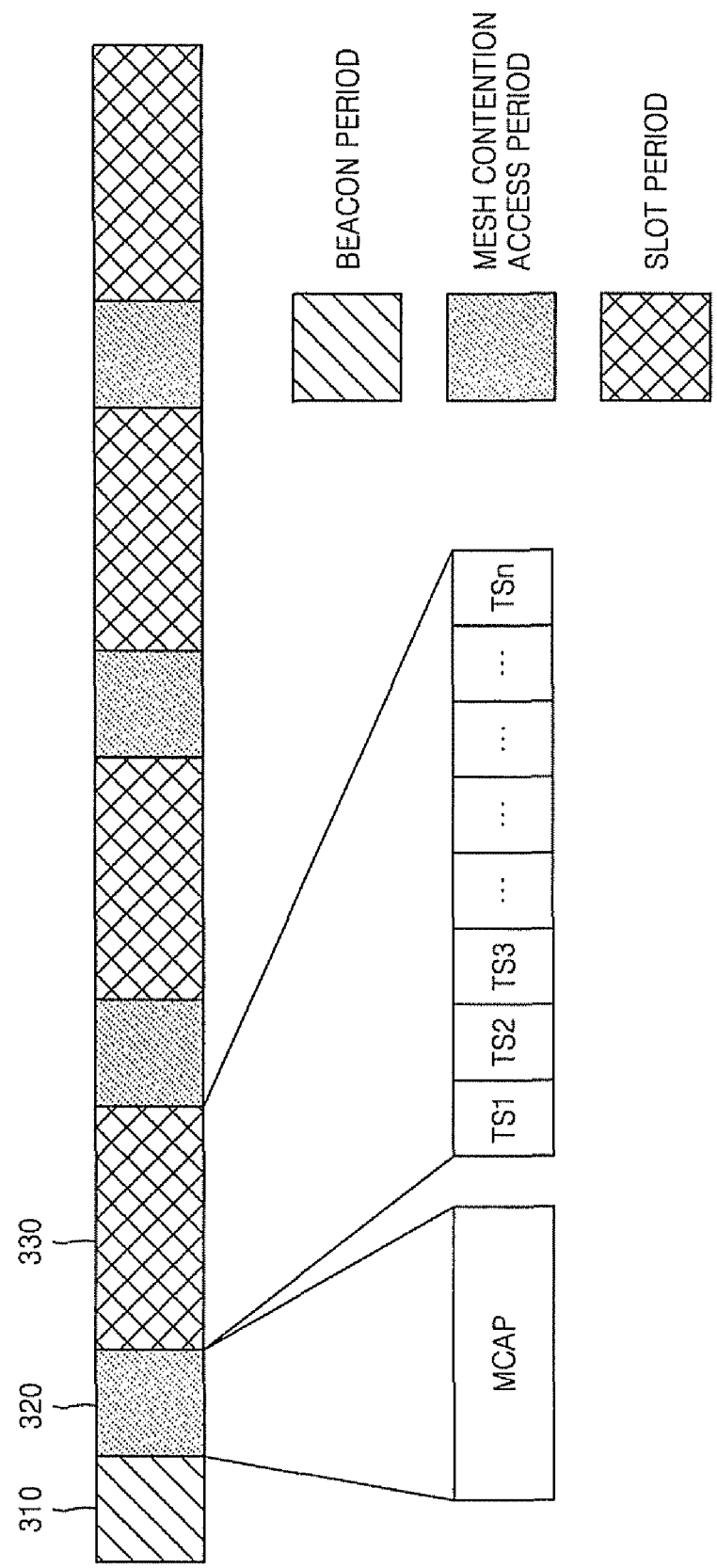

New node (600)

DISTRIBUTED CHANNEL HOPPING METHOD IN WIRELESS AD-HOC NETWORK

CROSS-REFERENCE TO RELATED PATENT APPLICATION

This application claims the benefit of Korean Patent Application Nos. 10-2008-0111853, filed on Nov. 11, 2008 and 10-2009-0074003, filed on Aug. 11, 2009, in the Korean Intellectual Property Office, the disclosure of which is incorporated herein in its entirety by reference.

BACKGROUND OF THE INVENTION

1. Field of the Invention

The present invention relates to a distributed channel hopping method in a lower power wireless ad-hoc network, and more particularly, to a method of efficiently and stably transmitting and receiving beacons of router nodes in a wireless ad-hoc network between router nodes and neighboring nodes.

2. Description of the Related Art

The IEEE 802.15.4 medium access control (MAC) is a conventional data link layer technology used to constitute a low power wireless network. Under the IEEE 802.15.4 MAC, all nodes included in the low power wireless network share a single channel and use a random medium access method to perform communication. If the number of nodes increases, packets collide due to frequent message exchange for channel access. Furthermore, when IEEE 802.15.4 MAC used in the environment where the heterogeneous wireless devices (e.g. a wireless local area network (LAN), Bluetooth, etc.) are exist, the communication quality deteriorates due to interferences from the heterogeneous wireless devices which uses the same radio frequency band.

In an IEEE 802.15.4 MAC multi-hop network, personal area network (PAN) coordinators and coordinator nodes need to periodically transmit beacons thereof. To this end, it is necessary to form multiple superframe duration (SD) slots in a single beacon interval and schedule multiple SD slots of each coordinator so as not to overlap. The forming of multiple SD slots needs a very small ratio of multiple SD slots with respect to the beacon interval. Thus, communication efficiency dramatically deteriorates in a multiple-hop topology.

SUMMARY OF THE INVENTION

Each node included in a network uses resources such as a frequency channel and a time slot to perform communication. Thus, such wireless resources must be allocated to each node in order to perform communication.

In a small network, a network manager node may allocate wireless resources to each node. However, in a large network, a central manager node may have difficulties in allocating all resources of the network to each node. It may take a lot of time to transfer information of the network to a central node and transmit a transfer result to an end node. In addition, the network may not operate wholly or partially due to a problem that occurs in a manager node or in a node in a center path.

The present invention provides a distributed operating method used to establish a channel hopping based wireless ad-hoc network.

The present invention also provides a distributed channel hopping communication method in a low power wireless ad-hoc network in combination with a time division multiple access (TDMA) channel access method where the time is divided into time slots.

According to an aspect of the present invention, there is provided a distributed channel hopping method in a wireless ad-hoc network, the method including: at a node that is to access the wireless ad-hoc network, receiving beacons of a plurality of nodes included in the wireless ad-hoc network through a channel scanning process; obtaining information from the received beacons about offset values used by a plurality of neighboring nodes of the first node within collision range; determining a first offset value to be used by the first node based on the information about the offset values used by the plurality of neighboring nodes; and transmitting a message including the first offset value to the plurality of neighboring nodes and determining whether any one of the plurality of neighboring nodes uses the first offset value. To prevent a collision, nodes transmit their offsets to neighboring nodes, and the neighboring nodes that have received the offsets determine whether nodes in a collision range use the same offset.

According to another aspect of the present invention, there is provided a beacon transmission and reception scheduling method using a distributed channel hopping method in a wireless ad-hoc network, the method including: transmitting beacons using channel hopping, before establishing the wireless ad-hoc network including a plurality of nodes having a BP including at least one time slot, and receiving beacons of a plurality of neighboring nodes of each of the plurality of nodes; collecting information about the wireless ad-hoc network and information about the plurality of neighboring nodes from the received beacons; scheduling the receiving of the beacons that are transmitted from the plurality of neighboring nodes in the BP, using TDMA in each of the at least one time slot based on the information about the plurality of neighboring nodes; and scheduling transmitting of a beacon in each of the at least one time slot.

According to another aspect of the present invention, there is provided a distributed channel hopping method in a wireless ad-hoc network using a plurality of channels, the wireless ad-hoc network including: a plurality of nodes each having a previously determined offset value and changing channels according to a previously determined hopping pattern, the plurality of nodes including at least one time slot, using a BP in which beacons are transmitted, and the at least one time slot is used in a TDMA manner.

BRIEF DESCRIPTION OF THE DRAWINGS

The above and other features and advantages of the present invention will become more apparent by describing in detail exemplary embodiments thereof with reference to the attached drawings in which:

FIGS. 2A and 2B illustrate channel hopping patterns according to embodiments of the present invention;

FIG. 3 illustrates a cyclic frame according to an embodiment of the present invention;

DETAILED DESCRIPTION OF THE INVENTION

Figure 1:
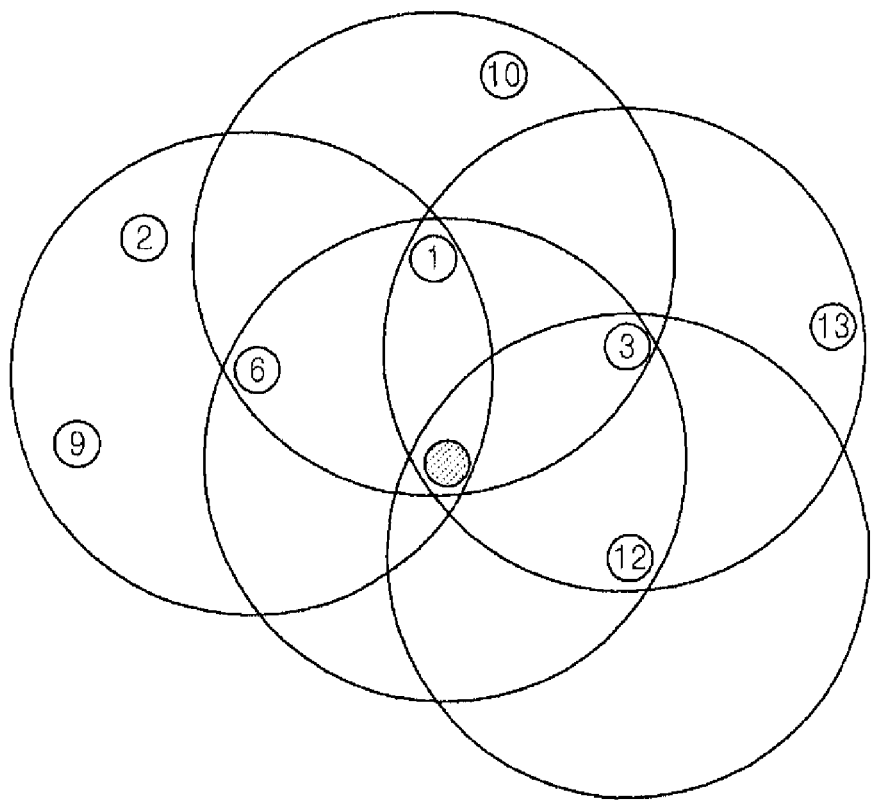
FIG. 1 illustrates a wireless ad-hoc network according to an embodiment of the present invention.

The present invention will now be described more fully with reference to the accompanying drawings, in which exemplary embodiments of the invention are shown. Like reference numerals denote like elements throughout. While describing the present invention, detailed descriptions of related well known functions or configurations that may obscure the description of the present invention will be omitted.

The present invention provides a method of efficiently and stably transmitting beacons of router nodes in a wireless ad-hoc network, e.g. a wireless sensor network, to neighboring nodes and receiving beacons of the neighboring nodes.

The present invention provides a medium access method in which a plurality of wireless nodes use different wireless channels for time slots having a uniform size without wireless interference of other wireless nodes that operate in a network. A plurality of nodes that operate in a network according to the medium access method use wireless resources that do not overlap with other wireless nodes in terms of time and frequency regions, thereby obtaining signal orthogonality. In this regard, each node maintains the signal orthogonality by receiving a respective channel hopping sequence or hopping pattern.

A network environment used to realize a distributed channel hopping method, which is a concept of channel hopping, and frames used in nodes included in a network according to the present invention are described with reference to FIGS. 1 through 3.

A distributed channel hopping method in a wireless ad-hoc network according to the present invention, including a method of allocating channel hopping offset values in a distributed manner, a method of accessing a network in a new node, and a method of transmitting beacons to neighboring nodes, is described with reference to FIGS. 4 through 7.

FIG. 1 illustrates a wireless ad-hoc network according to an embodiment of the present invention.

The conventional IEEE 802.15.4 access media layer constitutes a tree type network in which all nodes, except a personal area network (PAN) coordinator, have parent nodes which the nodes access. Meanwhile, a plurality of wireless nodes included in the wireless ad-hoc network of the present invention constitutes a mesh type network. However, the present invention is not limited thereto and a variety of modifications, such as a star type network, a network comprising a combination of the start type network and the mesh type network, and the like, can be made.

Referring to FIG. 1, a plurality of nodes included in the wireless ad-hoc network can exchange information with each other. That is, the wireless nodes of the present embodiment can transmit and receive data to and from at least one neighboring node.

It is assumed that the wireless nodes included in the wireless ad-hoc network of the present embodiment can change a plurality of channels provided by a physical layer. For example, an IEEE 802.15.4 physical layer provides 16 channels available in a 2.4 GHz band.

Therefore, a plurality of router nodes included in the wireless ad-hoc network of the present embodiment uses a plurality of channels to schedule beacons, which reduces the time necessary for all nodes of the wireless ad-hoc network to transmit beacons compared to a method of using a single channel.

A channel hopping method is used to access the plurality of channels as shown in FIGS. 2A and 2B. According to the channel hopping method, nodes of a network change channels according to a previously determined hopping pattern. In this case, offset values are allocated to each node in order to prevent channels used by nodes and neighboring nodes from overlapping. Thus, a hopping sequence used by nodes is orthogonal to time and frequency.

FIGS. 2A and 2B illustrate channel hopping patterns according to embodiments of the present invention.

A channel hopping sequence is commonly used in a whole network. Each node has its own offset value in relation to 2-hop neighboring nodes. Thus, the 2-hop neighboring nodes use different channels during the same period of time.

When nodes (for example, the 2-hop neighboring nodes) that use the same channel are in a collision region in a channel hopping structure, if packets are simultaneously transmitted, the packets collide. To prevent such a collision, different offset values must be allocated to nodes in the collision region.

The collision region is determined according to a distance of transmission, sensitivity of a receiver, and the like. The collision region in view of a protocol is generally regarded as 2-hop neighboring nodes. To prevent packets from colliding, a region of 2-hop neighboring nodes is considered in designing the protocol in the present embodiment. In this regard, the protocol of the present embodiment may be extended to a network including neighboring nodes of more than 2-hops.

Referring to FIG. 2A, the channel hopping operates when an offset value is 0 (210). The channel hopping operates by changing channels according to the previously determined hopping pattern. For example, the channel hopping pattern is 20, 25, 13, 22, 17, . . .

Referring to FIG. 2B, an offset value is 2 in two nodes that use 16 channels. In this case, the channel hopping pattern is 20, 25, 13, 22, 17, . . . in a channel hopping sequence 220 when the offset value is 0, and the channel hopping pattern is 13, 22, 17, 15, . . . in a channel hopping sequence 230 when the offset value is 2.

In the present embodiment, the channel hopping method shown in FIGS. 2A and 2B is combined with a time division multiple access (TDMA) method and thus neighboring nodes transmit beacons through different channels. Also, since beacons are received from different neighboring nodes through different channels, it is possible to stably operate a network in spite of an interference signal. This will be described in more detail with reference to FIGS. 4 through 7.

FIG. 3 illustrates a cyclic frame according to an embodiment of the present invention. It is assumed that nodes in a wireless ad-hoc network of the present invention use the cyclic frame shown in FIG. 3.

Referring to FIG. 3, the cyclic frame includes a plurality of beacon periods (BPs) 310, a plurality of mesh contention access periods (MCAPs) 320, and a plurality of slot periods (SPs) 330. Each of the BPs 310 includes at least one beacon time slot and thus the number of MCAPs 320 and the SPs 330 corresponds to the number of beacon time slots. For example, if the number of beacon time slots included in a BP 310 is 3, the cyclic frame may include three MCAPs 320 and three SPs 330.

The BPs 310, the MCAPs 320, and the SPs 330 include at least one time slot, respectively. The number of time slots included in each of the BPs 310, the MCAPs 320, and the SPs 330 may change according to an objective of the network.

Therefore, the length of the BPs 310 is variable. That is, the length of the BPs 310 is dynamically designated according to a corresponding application. A renewal interval of channel hopping sequence information or time information may dynamically change according to a corresponding application or a wireless environment.

The BPs 310 are used to transmit beacons between nodes. Beacon frames only can be transmitted in the BPs 310. The BPs 310 include cyclic frame structure information. The cyclic frame structure information includes a beacon period interval value (BI), a BPs, a flag indicating whether a star topology is supported, channel hopping information such as time synchronization information, a channel hopping sequence, an offset value, and the like.

The BPs 310 operate based on TDMA. Nodes are required to access channels within a previously determined time in a TDMA manner. To this end, the time information included in the BPs 310 is used. The BPs 310 have a structure including several time slots. The length of each time slot is longer than the time necessary to transmit a single beacon frame.

The number of time slots of the BPs 310 is determined by a value established by a network coordinator (a PAN coordinator). For descriptive convenience, it is assumed that the number of beacon time slots is N (where N is a natural number).

The number N of the beacon time slots must change according to the size of the network and the number of nodes included in the network. The greater the network or the more nodes included in the network, the greater the number N of beacon slots, and vice versa.

In the BPs 310, beacons may be transmitted through a common channel or by using a channel hopping method. Nodes can reduce the number of time slots necessary for transmitting beacons when the channel hopping method is used in the BPs 310. Although a multi-channel is used to exchange data in the present invention, a beacon and a control message may be used through a common channel that is a previously agreed single channel.

The MCAPs 320 are used to constitute a mesh topology. The length of the MCAPs 320 has a dynamic value. Information about the dynamic value is described in the BPs 310. In the MCAPs 320, the time slots of the BPs 310 or the SPs 330 are scheduled to be used. The MCAPs 320 of the present embodiment include a control signal and transmit data using the time slots of the SPs 330. In this case, a scheduling operation is a prerequisite to use the time slots of the SPs 330.

The MCAPs 320 includes a data control signal, for example, link information indicating a place where data is included, thereby solving a collision problem that occurs when an alarm signal is conventionally transmitted in a MCAP by adding a time slot to the MCAP. The channel hopping needs the MCAPs 320 in order to exchange the control message or the data control signal between neighboring nodes. All nodes must use the same channel, for example, a previously established mesh control channel, in order to communicate between nodes in the MCAPs 320.

Data is transmitted in a TDMA manner, whereas the control message or the control signal uses a competition based channel access method that does not need a scheduling operation in the MCAPs 320.

The SPs 330 are used to transmit data between nodes. The SPs 330 are used to exchange data frames between nodes that are allowed to access channels in the MCAPs 320. Nodes that have succeeded in receiving a bandwidth through competition in the MCAPs 320 use a single time slot or a plurality of time slots to transmit data frames as scheduled in the SPs 330.

Figure 4:
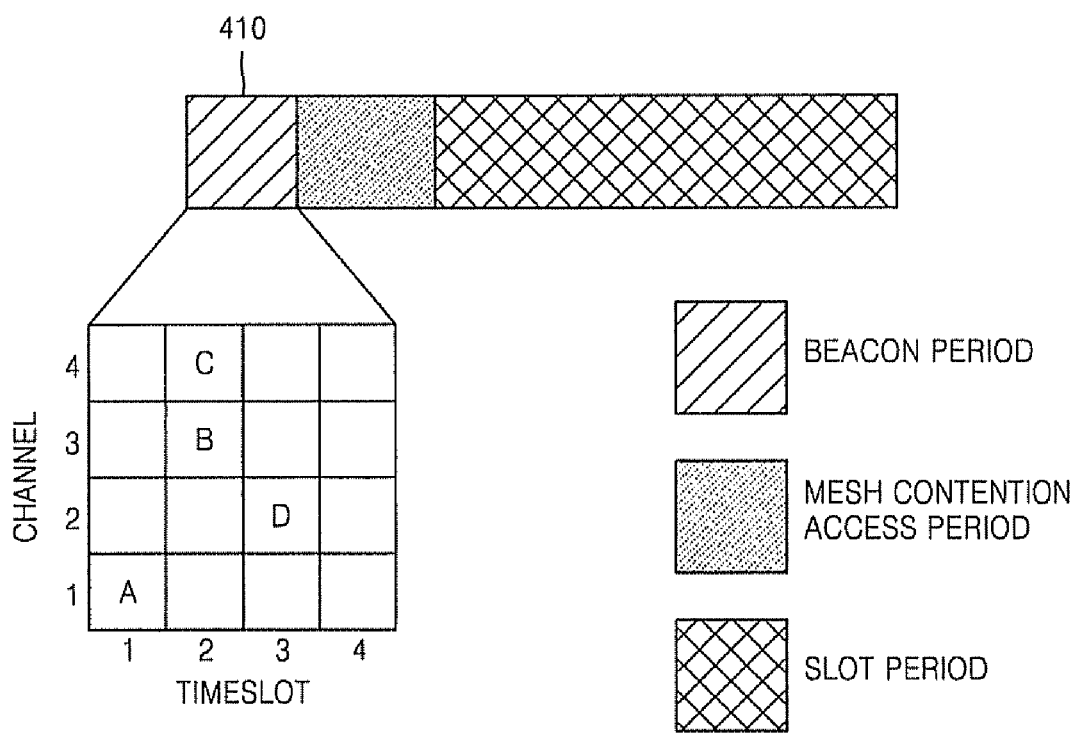
FIG. 4 illustrates a beacon period (BP) in which a scheduling operation is performed by combining time division multiple access (TDMA) and channel hopping, according to an embodiment of the present invention.

FIG. 4 illustrates a BP in which a scheduling operation is performed by combining TDMA and channel hopping, according to an embodiment of the present invention. Referring to FIG. 4, each of a plurality of router node selects a channel used for each of a plurality of time slots based on an offset value allocated to the router nodes, thereby preventing interference between neighboring nodes. A coordinator node A that has first transmitted a beacon transmits the beacon to a first time slot. The nodes receiving the beacon frame (node B and C) are previously informed of the offset value of the coordinator node A and its beacon transmission which is scheduled at a first time slot. Thereafter, the nodes receive beacon frame from coordinator node A at first time slot in BP by changing their channels to a channel used by the coordinator node A.

Each router relays a beacon received therein to its own channel and notifies neighboring nodes about the relay, so that the neighboring nodes can receive the beacon. In this manner, all nodes of a network establish beacon receiving and transmitting time.

In more detail, it is assumed that the number of channels is 4, and a channel hopping pattern is {1, 2, 3, 4}. Offset values 0, 1, 2, and 3, respectively, are allocated to four nodes A, B, C, and D.

The node A that is a PAN coordinator node is scheduled to transmit its own beacon to a first time slot of the BP.

The node A uses its own channel, a first channel in the first time slot to broadcast its own beacon. In this regard, neighboring nodes B and C are supposed to receive the beacon of the node A in the first time slot. An offset value of the node A is used to receive the beacon after changing a channel to the first channel used by the node A in the first time slot.

The nodes B and C transmit their own beacons in a second time slot. The node B uses its own channel, a third channel, in the second time slot, to broadcast its own beacon. The node C broadcasts its own beacon through its own channel, a fourth channel. In this regard, two nodes included in a collision region simultaneously can broadcast their beacons by using the channel hopping method of the present invention.

A node D is scheduled to receive the beacon from the node B. The node D uses the offset value of the node B to change a channel into the third channel used by the node B in the second time slot, and receives the beacon from the node B.

The node D transmits its own beacon in a third time slot. In the same manner as described above, the node D uses its own offset value to broadcast the beacon through its own channel, the second channel, in the third time slot.

Nodes included in the network follow the rules below in order to transmit their own beacon frames.

All nodes excluding a network coordinator (e.g. the PAN coordinator) receive a beacon frame of at least one neighboring node and transmit their own beacon frames in order to transmit beacon frames from the network coordinator to the network. Thus, information received from the network coordinator can be quickly transmitted to the whole network.

Figure 5:
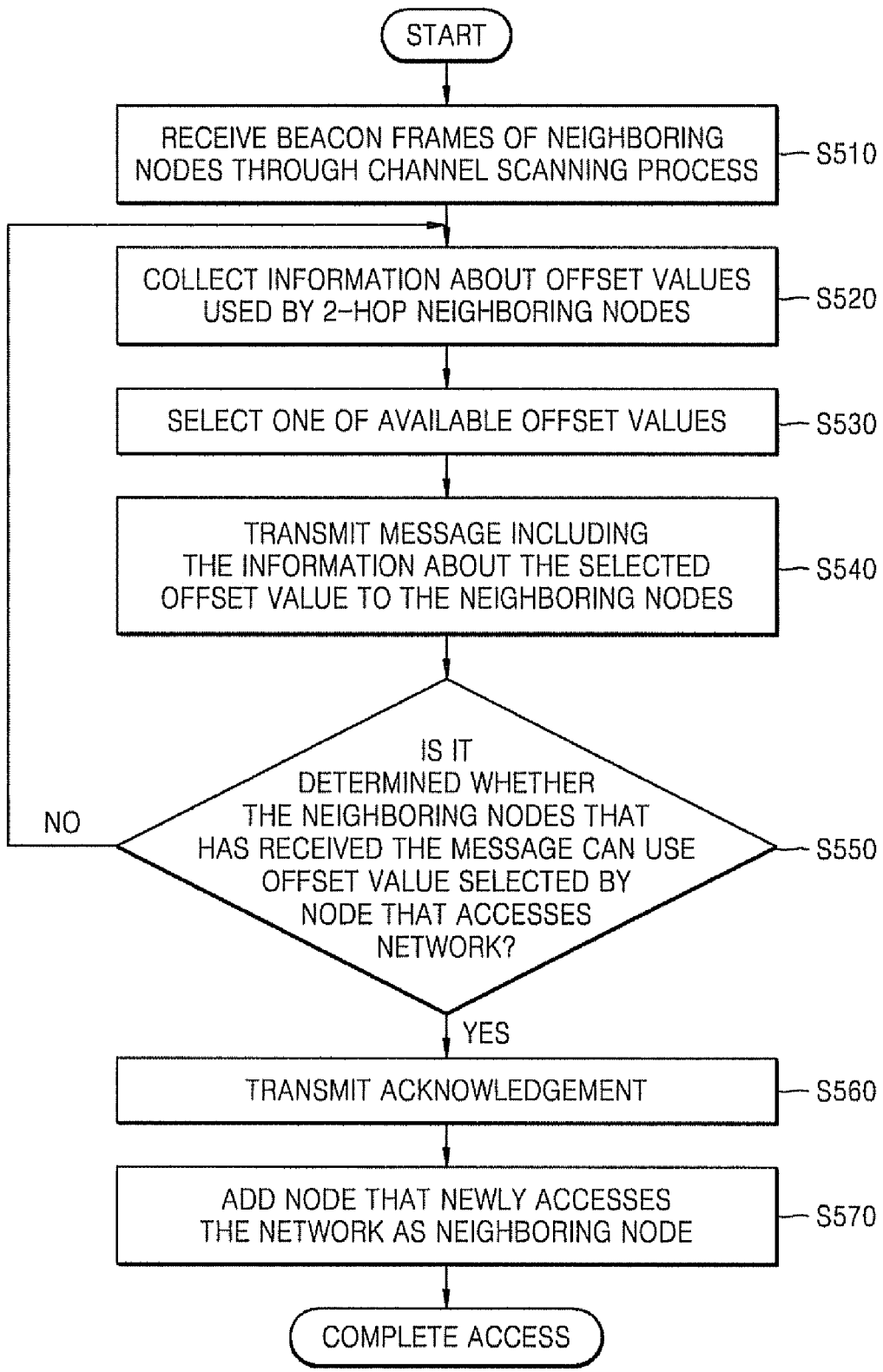
FIG. 5 is a flowchart illustrating a method of accessing a network by a new node, according to an embodiment of the present invention.

FIG. 5 is a flowchart illustrating a method of accessing a network by a new node, according to an embodiment of the present invention.

Network access means that a new node accesses a previously existing node. Referring to FIG. 5, the new node that accesses the network receives beacon frames of neighboring nodes through a channel scanning process (operation 510). In this case, beacons of all neighboring nodes are not collected and information about a single node or a previously established number of nodes can be collected according to a request of an upper layer.

Nodes included in the network periodically transmit their own beacons through a common channel by collecting offset values used by neighboring nodes as bitmap information and transmitting the bitmap information in their beacons. This will be described in more detail with reference to FIG. 6.

The new node that accesses the network collects beacons of the neighboring nodes and collects information about the network and the neighboring nodes (operations 510 and 520). Thus, information of offset values used by 2-hop neighboring nodes within a collision range is obtained. The new node that accesses the network determines an offset value to be used by itself from among offset values other than the offset values used by the 2-hop neighboring nodes (operation 530).

An association request message is transmitted to one of neighboring nodes in a MCAP (operation 540). The association request message includes offset value information to be used. The association request message is used by a node that is to access the network so as to request a node included in the network for permission to enter the network. In general, authorization for entering the network is determined and addresses are allocated when the association request message is transmitted and an association response is received.

The node that has received the association request message determines whether an offset value selected by the new node that accesses the network is available (operation 550). If the offset value is used by at least one of neighboring nodes of the new node that accesses the network, an association response indicates that the offset value is unavailable and a new offset value is allocated to the new node that accesses the network (operation 520).

If the node determines that the offset value is available, the association response is normally transmitted to a node. The node that receives the association response broadcasts an acknowledgement of the association request message to neighboring nodes (operation 560). The neighboring nodes that have received the acknowledgement add the new node that accesses the network as a neighboring node thereof (operation 570).

Figure 6:
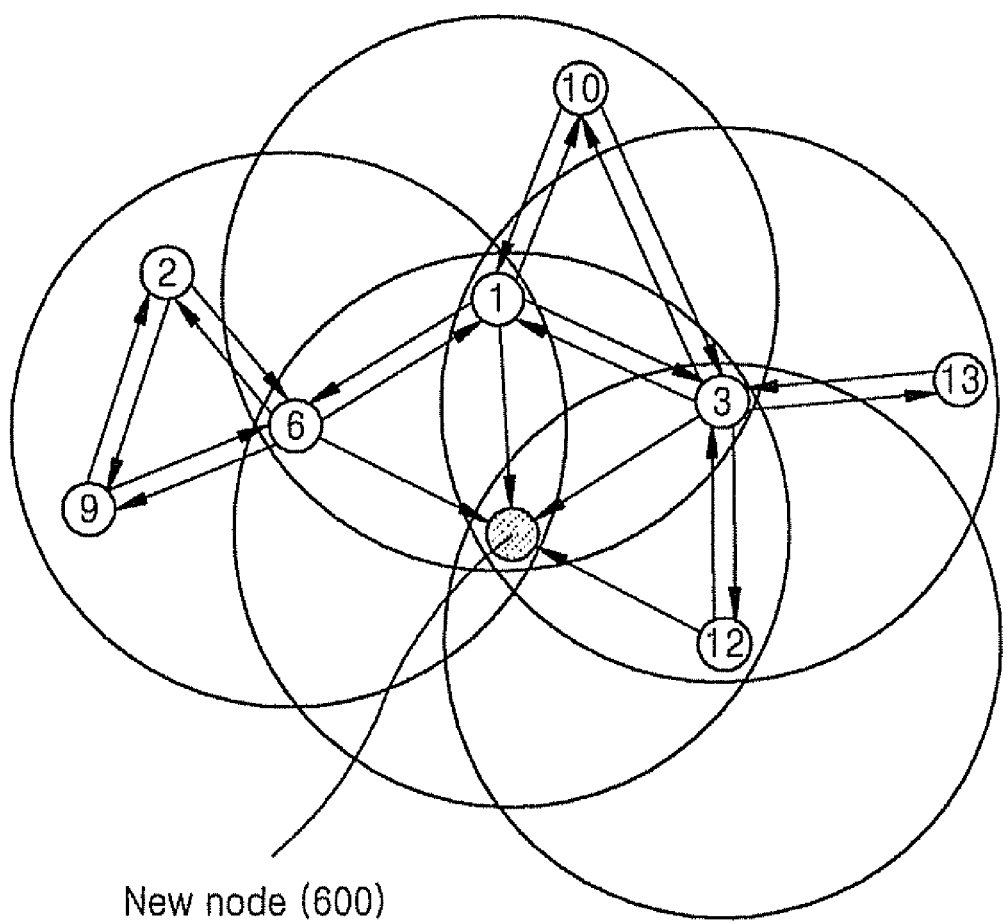
FIG. 6 is a diagram for explaining an operation of determining an offset value when a new node enters a network, according to an embodiment of the present invention.

FIG. 6 is a diagram for explaining an operation of determining an offset value when a new node enters a network, according to an embodiment of the present invention.

In operation 510 shown in FIG. 5, the nodes included in the network periodically transmit their own beacons through the common channel by collecting offset values used by neighboring nodes as bitmap information and transmitting the bitmap information in their beacons.

Referring to FIG. 6, nodes 1, 3, 6, and 12 transmit neighboring offset bitmap information in their beacons as shown below.

Neighboring offset bitmap of the node 1={1, 3, 6, 10}
Neighboring offset bitmap of the node 3={1, 3, 12, 13}
Neighboring offset bitmap of the node 6={1, 2, 6, 9}
Neighboring offset bitmap of the node 12={3, 12}

Information about offset values used by the 2-hop neighboring nodes within the collision range can be obtained based on the neighboring offset bitmap information. Thus, a node 600 that accesses a network determines an offset value that it may use from among offset values other than the offset values used by the 2-hop neighboring nodes. The node 600 can use offset values {0, 4, 5, 7, 8, 11, 14, 15}.

The method of allocating the channel hopping offset values in a distributed manner was described with reference to FIG. 4, and the method of accessing the network by a new node was described with reference to FIGS. 5 and 6. Hereinafter a method of transmitting beacons to neighboring nodes will be described.

All nodes may transmit beacons to neighboring nodes through a single channel or through a plurality of channels.

When all nodes use a single channel, nodes in a BP determine a time slot in which beacons of the nodes are transmitted. Beacon frames must be normally transmitted to neighboring nodes in order to stably operate a network.

According to the channel hopping method of the present invention, each node uses an offset value to determine a channel that each node uses. In this regard, the offset value is allocated as a single value in the 2-hop neighboring nodes in order to prevent collision.

Thus, when all nodes use a single channel, a scheduled single offset value can be used in the 2-hop neighboring nodes without using a separate scheduling method. For example, when the number of channels is 16, the number of time slots, i.e., beacon slots, is 16 and offset values are used as the beacon slots. Thus, beacons of all nodes included in the network can be transmitted to neighboring nodes without collision.

When all nodes use a plurality of channels, the nodes transmit beacons to neighboring nodes through the channels using the channel hopping method.

Figure 7:
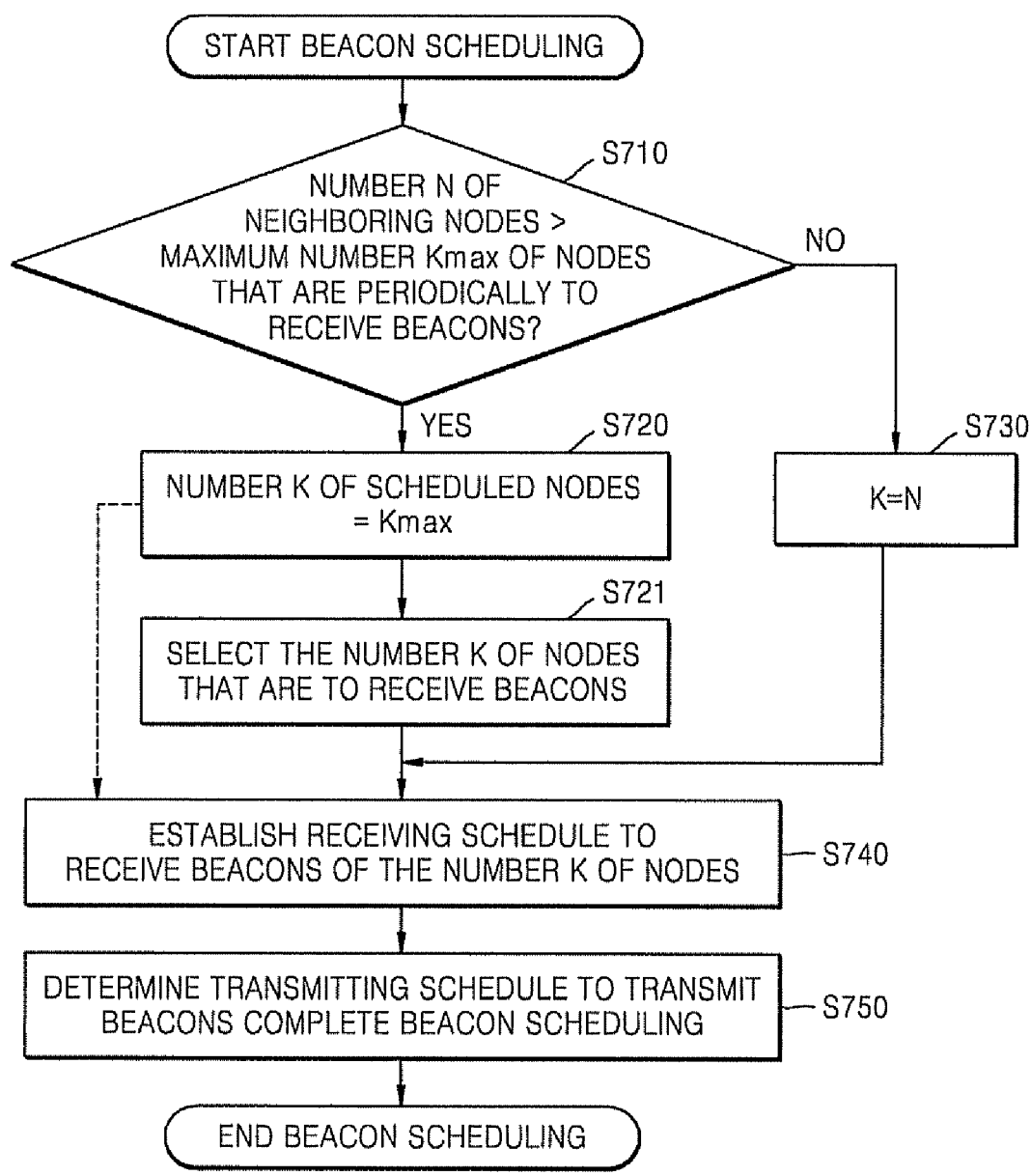
FIG. 7 is a flowchart illustrating a beacon scheduling method using channel hopping, according to an embodiment of the present invention.

FIG. 7 is a flowchart illustrating a beacon scheduling method using channel hopping, according to an embodiment of the present invention, Referring to FIG. 7, the beacon scheduling method uses variables Kmax, N, and K. Kmax denotes the maximum number of nodes that are to periodically receive beacons. N denotes the number of neighboring nodes found during a beacon collecting operation. K denotes the number of nodes that are to be scheduled.

It is determined whether the number N of neighboring nodes is greater than the maximum number Kmax of nodes that are to receive beacons among neighboring nodes (operation 710). If the number N is greater than the maximum number Kmax, the number K of nodes to be scheduled is the same as the maximum number Kmax (operation 720). The number K of nodes that are to selectively receive beacons is selected (operation 721). In this case, the number K of nodes have different beacon transmission time slots. Operation 721 is optional and thus operations 720 through 740 may be performed without operation 721.

If the number N is not greater than the maximum number Kmax, the number K of nodes to be scheduled is the same as the number N (operation 730). BPs are allocated in order to receive beacons of the number K of nodes. In this regard, offset values of the number K of neighboring nodes and time slots in which beacons are transmitted must be stored.

Time slots in which beacons are transmitted are determined. In the present embodiment, nodes excluding a PAN coordinator receive at least one beacon and transmit their own beacons. Thus, when beacon time slots are determined, available time slots are allocated among time slots after a firstly received beacon time slot. For example, when beacons of neighboring nodes are established to receive $3^{rd}$, $4^{th}$, and $6^{th}$ time slots, beacons after the $4^{th}$ time slot are transmitted. However, since it is established to previously receive the $4^{th}$ time slot, beacons are established to be transmitted in a $5^{th}$ time slot.

Through the above processes, a node that accesses a network can receive beacons transmitted from neighboring nodes and schedule transmission time slots of their beacon frames.

A beacon scheduling method using channel hopping in a wireless ad-hoc network prevents beacon frames from colliding so that the beacon frames are stably transmitted.

A channel hopping method of the present invention allocates different offset values to nodes within a collision range so that the nodes use different channels although the beacon frames are simultaneously transmitted during a predetermined period of time. Thus, beacon frames between 2-hop nodes do not collide in a single channel and thus it is unnecessary to collect information about 2-hop neighboring nodes when beacon slots are determined. Therefore, the time taken to collect information and energy consumption are reduced compared to a single channel beacon transmission method.

The beacon scheduling method of the present invention increases the number of beacon frames that are simultaneously transmitted in a network so that a greater number of beacon frames of nodes can be transmitted during a relatively reduced beacon interval. Furthermore, the beacon scheduling method of the present invention can quickly transmit information about the network via a coordinator node to the whole network.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A distributed channel hopping method in a wireless ad-hoc network, the method comprising:
   at a node that is to access the wireless ad-hoc network, receiving beacons of a plurality of nodes included in the wireless ad-hoc network through a channel scanning process;
   obtaining information from the received beacons about offset values used by a plurality of neighboring nodes of the first node within collision range;
   determining a first offset value to be used by the first node based on the information about the offset values used by the plurality of neighboring nodes; and
   transmitting a message including the first offset value to the plurality of neighboring nodes and determining whether any one of the plurality of neighboring nodes uses the first offset value.

2. The method of claim 1, wherein, if it is determined that any one of the plurality of neighboring nodes uses the first offset value, newly determining a value of the first offset value; and
   if it is determined that none of the plurality of neighboring nodes use the first offset value, adding the first node as a neighboring node of the plurality of neighboring nodes.

3. The method of claim 1, wherein the plurality of nodes included in the wireless ad-hoc network uses a beacon period (BP) to transmit beacons, the BP including at least one time slot, and the at least one time slot operates based on time division multiple access (TDMA).

4. The method of claim 3, wherein a length of each of the at least one time slot is greater than a time necessary to transmit a beacon.

5. The method of claim 3, wherein a number of the at least one time slot included in the BP changes according to a size of the wireless ad-hoc network and a number of the plurality of nodes included in the wireless ad-hoc network.

6. The method of claim 3, wherein each of the plurality of nodes included in the wireless ad-hoc network has a previously determined offset value, changes channels according to a previously determined hopping pattern, and, if a position of a time slot in which the plurality of neighboring nodes transmit the beacons is determined, receives a beacon through a channel corresponding to the previously determined hopping pattern of the plurality of neighboring nodes in the determined time slot.

7. The method of claim 3, wherein each of the plurality of nodes included in the wireless ad-hoc network has a previously determined offset value, changes channels according to a previously determined hopping pattern, and, if a position of a time slot in which each of the plurality of nodes transmits the beacons is determined, receives a beacon through a channel corresponding to the previously determined hopping pattern of the plurality of neighboring nodes in the determined time slot.

8. The method of claim 1, wherein each of the plurality of nodes included in the wireless ad-hoc network changes channels according to the previously determined hopping pattern based on the allocated offset value, and the hopping pattern used by each of the plurality of nodes has orthogonality in terms of time and frequency.

9. A distributed channel hopping method in a wireless ad-hoc network using a plurality of channels, the wireless ad-hoc network comprising: a plurality of nodes each having a previously determined offset value based on information about offset values used by a plurality of neighboring nodes and changing channels according to a previously determined hopping pattern, the plurality of nodes including at least one time slot, using a beacon period (BP) in which beacons are transmitted, and the at least one time slot is used in a time division multiple access (TDMA) manner.

10. The method of claim 9, wherein a plurality of neighboring nodes within a collision range between the plurality of neighboring nodes and each of the plurality of nodes have different offset values.

11. The method of claim 9, wherein, if a plurality of neighboring nodes within a collision range between the plurality of neighboring nodes and each of the plurality of nodes determine a position of the at least one time slot in which beacons are transmitted based on the previously established offset value and hopping pattern, each of the plurality of nodes receives beacons through a channel corresponding to the previously determined hopping pattern of the plurality of neighboring nodes in the determined time slot.

12. The method of claim 9, wherein, if each of the plurality of nodes determines a position of the at least one time slot in which beacons are transmitted based on the previously established offset value and hopping pattern, each of the plurality of nodes receives beacons through a channel corresponding to the previously determined hopping pattern thereof in the determined time slot.

13. The method of claim 12, wherein, in the scheduling of the transmitting, each of the plurality of nodes except a network coordinator schedules its beacon transmission at the time slot which is after the first beacon receiving time slot.

14. A wireless ad-hoc network system using a distributed channel hopping method, the system comprising: a plurality of nodes each having a previously determined offset value based on information about offset values used by a plurality of neighboring nodes and changing channels according to a previously determined hopping pattern, the plurality of nodes including at least one time slot, using a beacon period (BP) in which beacons are transmitted, and the at least one time slot is used in a time division multiple access (TDMA manner).

15. The system of claim 14, wherein, if a plurality of neighboring nodes within a collision range between the plurality of neighboring nodes and each of the plurality of nodes determine a position of the at least one time slot in which beacons are transmitted based on the previously established offset value and hopping pattern, each of the plurality of nodes receives beacons through a channel corresponding to the previously determined hopping pattern of the plurality of neighboring nodes in the determined time slot.

16. The system of claim 14, wherein, if each of the plurality of nodes determines a position of the at least one time slot in which beacons are transmitted based on the previously established offset value and hopping pattern, each of the plurality of nodes receives beacons through a channel corresponding to the previously determined hopping pattern thereof in the determined time slot.

* * * * *